Jan. 17, 1933.     B. V. KORVIN-KROUKOVSKY     1,894,919
SEAPLANE
Filed April 9, 1931     3 Sheets-Sheet 2

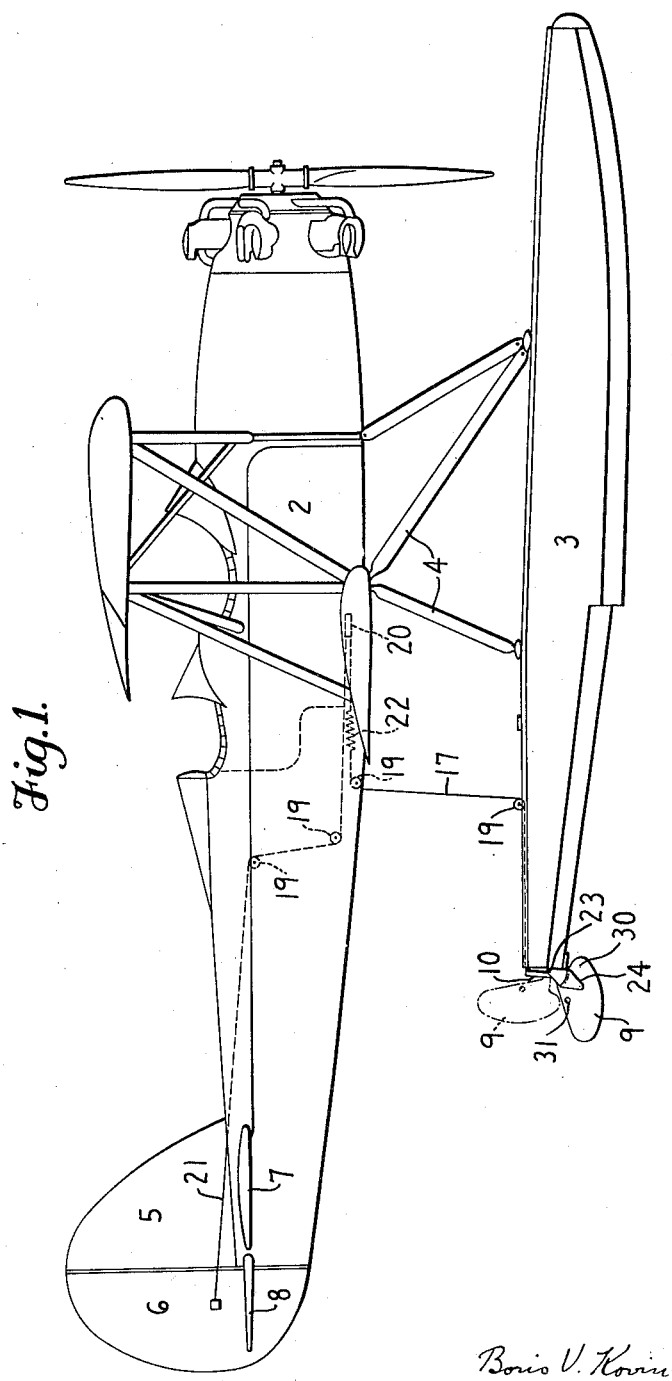

INVENTOR
Boris V. Korvin-Kroukovsky
BY
ATTORNEY

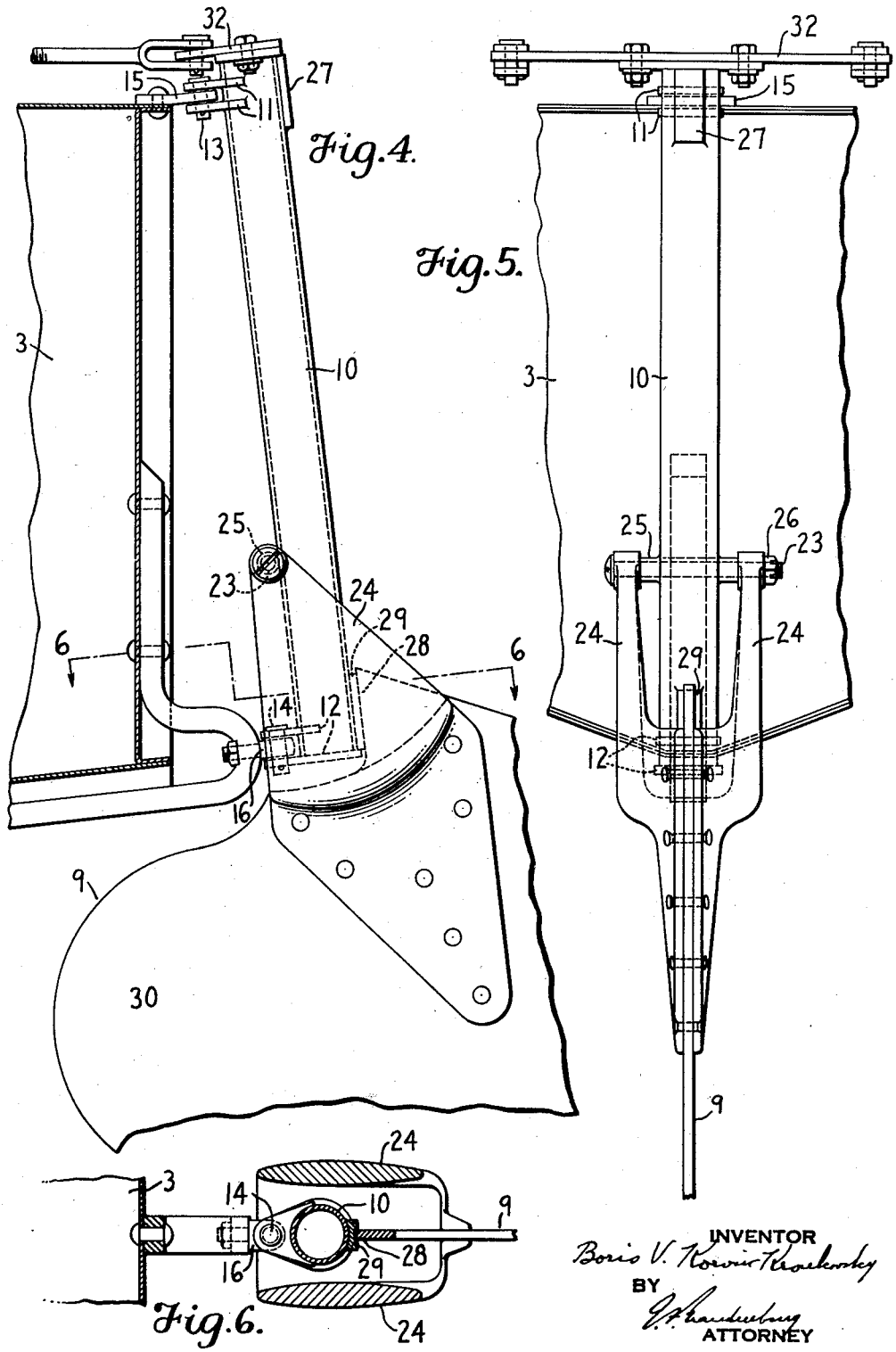

Patented Jan. 17, 1933

1,894,919

UNITED STATES PATENT OFFICE

BORIS V. KORVIN-KROUKOVSKY, OF BEECHHURST, LONG ISLAND, NEW YORK, ASSIGNOR TO EDO AIRCRAFT CORPORATION, OF COLLEGE POINT, NEW YORK, A CORPORATION OF NEW YORK

SEAPLANE

Application filed April 9, 1931. Serial No. 528,775.

The invention relates to air-and-water craft such as seaplanes and flying-boats.

A particular object of the invention is to improve very materially the ability to handle such air-craft on water. Other objects of the invention have to do with facility in taking off from the water into the air, facility and safety in alighting on the water under certain conditions, and avoidance of injury to the blades to be described by floating obstructions or otherwise. Other objects are to make easy the control of the water rudders of seaplanes and to keep the water rudder or rudders from hampering or inhibiting the operation of the air rudder.

Seaplanes have had a bad reputation for difficulty in taxying. The seaplane in repect to drift on water under the action of the wind, with engine throttled, resembles a sailboat, but with the sail and keel areas not properly disposed. For proper stability in the air, the airplane is always equipped with comparatively large vertical tail surfaces, and this surface together with the side area of the fuselage, etc., forms an equivalent to sail area, the center of which is well aft of the center of submerged side area (keel area) of the floats. In this respect the seaplane on water resembles a schooner yacht with the mizzen only set up. It has a strong tendency to turn and face into the wind, and it is very difficult to make it turn around to head downwind, which can be done only by use of a good deal of engine power driving the propeller to produce a strong blast of air on the air rudder.

In some seaplanes even this is not sufficient, and the pilot may not be able to turn the machine around. In other seaplanes, even though it may be possible to effect a turn on water in a strong wind, it is likely to be difficult to do so and it is harmful to the airplane, because the large amount of spray damages the propeller and taxying with excessive speed with strong side wind is likely to capsize the seaplane. Turning at reasonably low speed on the water in wind, if it were possible, would be very desirable and not dangerous, and the ability to do that is an object and advantage of this invention.

The water rudders shown on the attached drawings are arranged in such a way that all the necessary area of the blade is below the keel of the seaplane float at the stern, and is subjected to the action of undisturbed water. The rudder itself has sufficient area thus disposed to move the center of the float keel area (side area of the float acted on by water) aft to coincide approximately with the center of "sail" area. As a result, some seaplanes become perfectly neutral on water, having no tendency either to turn into the wind or to turn away from it. Others still retain the tendency to turn into the wind, but the tendency is so much weakened that there is no difficulty to overcome it by the action of either the air or the water rudders, or both.

The keel effect of these water rudders is distinctive. Even if not used as turnable rudders, but merely as neutralizing keel area aft of the floats and below the wake, they already greatly improve the controllability of the seaplane.

In addition and in conjunction with this effect, the steering facility on water contributed by the water rudders, as such, is important.

It is desirable, if not essential, to interconnect air and water rudders of seaplanes for simultaneous operation by the same pedal bar or other pilot's control. This has been proposed before, but a difficulty overlooked is that the water rudders are comparatively easily damaged, or in northern waters they can be frozen, so that they may not be able to move, and in consequence the air rudder, which is the lateral steering organ of the aircraft, may be prevented from responding to control. In order to make conjoint operation of the air and water rudders safe and satisfactory, yielding springs are incorporated, in this invention, in the connections to the water rudder or water rudders. These springs permit the air rudder to operate readily even in case damage to the water rudder makes its control bind.

However, this application of springs would naturally make water steering very inefficient, because the springs must stretch readily under heavy pull, in consequence of which the water rudder would not be sufficiently moved to get good action. That difficulty is met, by this invention, by causing the water rudder to be well balanced, i. e., so that its hinge or stern post axis is located somewhere near its center of pressure, as the result of which it can be moved with very little effort, and can be controlled through a comparatively light spring. It is desirable to have between ten and twenty per cent. of the rudder surface disposed ahead of the rudder hinge for this purpose.

The location of the blade below the keel of the float, whether the blade be considered as a neutral keel blade or as a water rudder, or as both, exposes it to the danger of striking obstructions with resultant possible damage. Also, when the seaplane is lowered from an inclined runway into water and the front portion of the float is already water borne, the rear portion still resting on the float would impose excessive load on the water rudder disposed below the keel.

Furthermore, in a strong wind when the pilot does not dare to come down wind onto the runway at excessive speed, he often cuts off the engine and lets the airplane drift backward on the water, in which case the stern of the floats and the water rudders would strike the runway first.

Again, when the seaplane is in the air, but its speed is reduced just prior to alighting on water, the air rudder moves easily, and at this low speed usually requires large movement for its effect. In particular, when landing with side wind, the motion of the seaplane is somewhat oblique, being combined of this forward velocity of from 40–70 miles per hour and the side velocity of the wind. Under such circumstances it is the practice among pilots to kick the air rudder hard to point the seaplane in the direction of motion, but to do it at the very last moment so that the direction of motion itself has no time to change. On such an occasion the air rudder is often found to be hard over at the instant when the seaplane touches the water. With the water rudders turned in unison with the air rudder, the water rudders suddenly catching the water in this condition may cause very quick and powerful turning, which would not only be disconcerting but might capsize the seaplane.

Realization of these and other problems has dictated that the blades of the present invention, whether they serve as keel area blades or as water rudders, should be fully retractable to elevated positions above the keels of the floats and behind their sterns, and that this operation be purely automatic under the various conditions that may arise. Each blade is hung on a horizontal pivot or its equivalent, so that the blade can swing in an arc rearward and upward behind the stern. In the case of a water rudder this pivot or swinging support is connected to the more or less vertical part, or stern post, with which the rudder is turned laterally. In consideration of the forward balance area of the rudder blade it is highly desirable that the horizontal pivot be disposed a substantial distance above the keel of the float at the stern, in order that the balance portion of the blade may be carried above the keel line when the blade retracts.

In addition to this automatic retraction feature, the blade is made of a special shape which insures that the blade will recede in the intended manner whether an obstruction strikes the blade as the float moves forward through water, or whether the seaplane drifts backward against an obstruction or against a runway, or whether the force acting against the blade is upward.

Other objects, features and advantages of the invention will become apparent to those skilled in the art.

In the accompanying drawings, forming part hereof:

Fig. 1 is a side elevation of a float seaplane with the invention applied thereto. The keel or rudder blade is shown in its normal, or downwardly protracted, position in full lines, and in a retracted or elevated position in broken lines.

Fig. 2 is a perspective view of the after portion of one of the floats, showing the blade in normal position and illustrating a portion of the control connections for operating the blade as a rudder.

Fig. 3 is a schematic plan view indicating the rear portions of the floats and fuselage, the water and air rudders, and the interconnected control for these rudders, the disposition of the control connections being somewhat simplified.

Fig. 4 is a view partly in vertical section and partly in side elevation at the stern of one of the floats, only a portion of the rudder blade being shown because of lack of space.

Fig. 5 is a rear elevation, the lower part of the blade being broken away.

Fig. 6 is a section on the line 6—6 of Fig. 4, the blade being largely broken away.

The seaplane illustrated in Fig. 1 has a fuselage 2 above twin floats 3 (Fig. 3), the fuselage and floats being connected by suitable struts and braces 4. The fuselage extending rearwardly beyond the floats carries the usual tail surfaces, including the fin 5, the air rudder 6, the stabilizers 7 and the elevators 8.

Each float is provided at the stern with a vertical rudder blade 9. In the normal or operative positions of these blades, practically all of the blade area is below the keel of the float at the stern, and is therefore subjected to the action of undisturbed water. It does not necessarily follow that these blades might not have additional area extending up into the region of the wake or above it, but such additional area is not necessary and would be an inconvenience. What is to be understood is that the areas of the blades below keel, which is preferably substantially their whole area, is sufficient not only for their function as water rudders, but also to move the center of float keel area rearward to a point where it substantially coincides (with respect to transverse zone) with the center of sail area of the seaplane, as explained in an earlier part of the specification. The expression "float keel area" used in this connection is to be understood as the side area of the floats which are acted on by water when the seaplane is at rest or taxying on water. The advantage thus obtained in the handling of such machines when they are water borne has been pointed out.

Each of the blades 9 is connected with a rudder post 10 which has upper and lower sets of hinge lugs 11 and 12 to rotate or swing about two approximately vertical pins 13 and 14, these pins engaging openings in fittings 15 and 16 which are fixed to the stern of the float.

Control cables 17 and 18 are connected to the opposite ends of tiller bars 32 fixed to the upper ends of the rudder posts of the two water rudders. These cables are led around suitable direction-changing guides 19 on the floats and on the fuselage, the cable 18 connecting the two water rudders to turn in unison in the same direction, and the cables 17 connecting the rudders with the rudder bar 20 in the cockpit. Other control cables 21 connect this same pilot's control member with the air rudder 6. Consequently when the pilot moves the rudder bar 20 he operates the air rudder and the water rudder simultaneously and similarly, but attention is called to the yielding springs 22 in the cables 17 of the water rudders. The function of these springs, as previously explained, is to enable the pilot to turn the air rudder readily notwithstanding that the water rudders may refuse to move because of injury or freezing. In this way a safety feature of great importance is introduced.

Rigidly secured to each rudder post is a transverse trunnion or pivot pin 23, which is located some distance from the lower end of the post. In the concrete example this pin is about two or three inches above the stern end of the keel of the float. The blade 9 is attached to this trunnion pin by means of two hinge brackets 24, which are fixed to opposite sides of the blade, these brackets extending upward and being pivoted at their upper ends on the opposite ends of the pin. The connection between the brackets 24 and the pin 23 is made rigid in the transverse direction by suitable provisions, as by confining the upper ends of the brackets between the ends of a tube 25, which is welded or otherwise united to the rudder post, and the head of the pin at one end and a nut 26 at the other end By reason of these transverse hinge connections, the blades 9, and each of them, is free to swing up and down in a rearward arc. The uptravel of the blade is limited by the upper edge of the blade striking a stop plate 27 on the back of the rudder post at the top, the blade in this extreme position lying upward along the back of the post. The downward movement of the blade is limited by the shoulder 28 of a notch in the top of the blade between the brackets coming against another stop plate 29 at the lower end of the back of the rudder post.

Ordinarily the weight of the blade keeps it in this lower position, but if any obstruction hits the blade as the float moves forward or rearward through the water, the blade can readily swing back until it is wholly above the keel line of the float and, therefore, can pass over any obstruction over which the float can pass.

The shape of the blade is such that the lower edge of it represents a section of a spiral line. The property of this line is such that a line perpendicular to the tangent of the curve at any point will pass considerably (in this instance about three inches) aft of the trunnion pin. When the float drifts backward onto an inclined runway, the force at the point of contact between the blade and the runway is usually perpendicular to the tangent to the curve at the point, i. e., passes aft of the trunnion bolt 23 and gives the moment which lifts up the blade. In this event the blade has a kind of cam action.

When seaplanes take off there are two distinct periods, the first from rest up to about 20 miles per hour, when the floats act as displacement boats, the second period when the speed increases from 20 miles to 40-70 miles per hour, when the floats rise on the steps and act as hydroplanes. In the second period the speed is sufficient to make the air rudder effective and it is desirable that the water rudders be retracted at this speed. Below 20 miles per hour or so, the air rudders are not very effective and it is highly desirable to have the water rudders in action. The weight of the water rudders, or possibly the force of additional springs, is such as to keep them in the water up to the speed of approximately 20 miles per hour, but to allow them to rise easily above that speed. In a similar way, when landing is made at a speed in the neighborhood of the 40-70 miles per hour range, the resistance of the water acting on the water rudders throws them aft and up very quickly, before they can exert any turning effect.

The fact that the blade area is almost wholly under the keel of the float is very important. The keel effect of a comparatively thin surface is from two to four times more powerful than the side keel area of the body of the float. On any approximately streamline body, or on a blade, such as an airplane wing or a rudder, the pressure is so distributed that the center of pressure is approximately at 25% of its length, which means that almost all of the pressure is over the forward portion of such body or blade, while the rear portion of it has very little pressure. Seaplane floats have often been built with comparatively sharp sterns, with rudders hinged on the stern and trailing back of it, with very little area, if any, projecting below the keel. Rudders so disposed work in the wake of the float and are not very effective. Any keel area of such rudders is practically destroyed, since the rudder merely forms a trailing edge of the float itself. By locating the blade of the present invention almost entirely below the keel of the float, it is taken out of the wake into solid water, and it is possible to utilize fully the pressure on its leading edge.

Attention is called to the substantial balance area 30 of the blade which extends forward of the vertical rudder hinge. This area is sufficient to balance the water rudders so that they are turned with little effort transmitted through the springs 22. As previously stated, the balance area should constitute about 20% of the total area of the blade, for best results.

I am aware that it has been proposed to extend the lower end of the water rudder of a seaplane float somewhat below the keel line of the float to serve as a skid when the seaplane descends on land, the rudder being slidable on a vertical post against the action of a shock-absorbing spring, the rudder otherwise being located as usual, that is to say behind the stern of the float. A construction of this kind is not too effective as a rudder and such incidental keel area as may be afforded by the blade is of little consequence. Rudders such as those referred to are not provided with a forward balance area, and could not be so provided because of the necessity of the rudder being vertically slidable. Without the balance feature the water rudder of a seaplane is deficient and unsafe in action, because it is hard to turn and this militates against the ease and certainty of control of the air rudder, which is interconnected with it. Without the balance area of the rudders of the present invention it would be impossible to control the water rudder through a readily stretchable spring as disclosed herein, which provision safeguards against disaster since it permits the air rudder to be effectively operated in flight even though the water rudder or rudders are bound.

A vertically sliding water rudder blade is not saved from injury, like the swinging blades of my invention, since the sliding blade can not yield to forces acting in a variety of directions. Thus, for example, a sliding blade can receive a very severe blow if the float slides with its rear keel over an obstruction for a certain distance and the obstruction hits the rudder just at the keel, in which event there would be no retracting effect whatever. Being mounted to slide on a vertical axis, such a blade will, of course, not retract due to horizontal resistance of the water on landing, and consequently it presents the possibility of danger as the result of the rudder catching in the water, as described above.

In the present invention, the elevation of the horizontal trunnion pin 23 above the keel of the float has a decided advantage, since it makes it possible to provide the blade with a forward balance area and still to retract this balance area above the keel of the float, so that the entire rudder is then back of the stern and above the keel, where it is well protected by these parts. The combination of a balanced water rudder blade with the fully retractable feature is much to be desired in the use of seaplanes.

Means are provided for securing the blade to the rudder post, in the retracted position, at any time when it is desired to have the water rudder out of the way. In Fig. 1 this provision takes the form of a hole 31 in the blade, through which a lashing can be passed.

It will be understood that the form and details of execution of various features of the invention may be varied, that parts of the invention may be used without others, and that the particular application and embodiment which have been shown and described are to be considered as illustrative of the invention rather than in a limiting sense.

While the invention has been described and illustrated as applied to a seaplane of the kind in which the float or floats and the fuselage, or body, are separated from each other, and are connected by suitable frame members, it will be evident that the invention is also applicable to the kind of seaplanes which are usually termed flying-boats and in which the body and the float, or hull, are joined or consolidated. In the case of a flying-boat, or in the case of any central float seaplane, a single water rudder, or neutralizing blade, properly proportioned can, of course, be employed in accordance with this invention to perform the same functions as the two blades illustrated herein.

I claim:

1. In a seaplane having a float, a blade normally disposed below the keel at the stern, and a transverse pivot on which said blade is adapted to retract automatically in a rearward arc to a position above the keel and behind the stern, said blade having a lower edge formed on a curve the properties of which are such that the blade will be retracted on encountering obstacles as well when the float moves rearward as when it moves forward.

2. In a seaplane having a float, the combination of a rudder hinge at the stern of the float, a rudder blade normally disposed below the float and having a balance area ahead of the hinge, and a transverse pivot on the rudder hinge on which said blade is adapted to retract in a rearward arc to a position above the keel and behind the stern, said blade having a lower edge formed on a curve the properties of which are such that the blade will be automatically retracted on encountering obstacles as well when the float moves rearward as when it moves forward.

3. In a seaplane having a float, the combination of a rudder hinge at the stern of the float, a rudder blade normally disposed below the float and having a balance area ahead of the hinge, a transverse pivot carried by the rudder hinge at a distance above the main keel line, and brackets extending upward from the blade and swung on said pivot so that the blade can swing to a position entirely above the keel and behind the stern, the weight of the blade and its connection with the rudder hinge being such that the blade is adapted to retract automatically in a rearward arc by reason of the resistance of the water at predetermined speeds, the blade normally occupying the position below the keel of the float by virtue of gravitational or like force sufficient to keep it in such position at lower speeds on water, the blade, furthermore, having a lower edge formed on a curve the properties of which are such that the blade will be retracted on encountering obstacles as well when the float moves rearward as when it moves forward.

BORIS V. KORVIN-KROUKOVSKY.